(12) United States Patent
Sanders et al.

(10) Patent No.: US 10,569,948 B2
(45) Date of Patent: Feb. 25, 2020

(54) THERMOFORMING SHEETS AND THERMOFORMED CONTAINERS PREPARED THEREFROM

(71) Applicant: Printpack Illinois Inc., Elgin, IL (US)

(72) Inventors: Daniel Clayton Sanders, West Point, VA (US); Amy Whiteman Sherrill, Mableton, GA (US); Rabeh H. Elleithy, Williamsburg, VA (US); Harold Stephen Bowen, Hayes, VA (US); Ronald W. Komro, Smyrna, GA (US)

(73) Assignee: Printpack Illinois Inc., Elgin, IL (US)

( * ) Notice: Subject to any disclaimer, the term of this patent is extended or adjusted under 35 U.S.C. 154(b) by 79 days.

(21) Appl. No.: 15/926,674

(22) Filed: Mar. 20, 2018

(65) Prior Publication Data
US 2018/0208382 A1   Jul. 26, 2018

Related U.S. Application Data

(63) Continuation of application No. 15/301,067, filed as application No. PCT/US2015/024026 on Apr. 2, 2015, now Pat. No. 9,950,849.
(Continued)

(51) Int. Cl.
B65D 75/58 (2006.01)
B65D 77/20 (2006.01)
(Continued)

(52) U.S. Cl.
CPC .......... B65D 75/5855 (2013.01); B32B 27/08 (2013.01); B32B 27/32 (2013.01);
(Continued)

(58) Field of Classification Search
CPC ................ B65D 75/5855; B65D 75/26; B65D 43/0202; B65D 77/2024;
(Continued)

(56) References Cited

U.S. PATENT DOCUMENTS 3,854,653 A * 12/1974 Engelsberger ......... B65D 75/26
  383/210
4,055,672 A * 10/1977 Hirsch .................. B65D 81/24
  426/127
(Continued)

FOREIGN PATENT DOCUMENTS

CN   101209765 A   7/2008
CN   101580153 A   11/2009
(Continued)

OTHER PUBLICATIONS

PCT International Search Report and Written Opinion for PCT/US2015/024026 dated Oct. 8, 2015 (11 pages).
(Continued)

*Primary Examiner* — Kareen K Thomas
(74) *Attorney, Agent, or Firm* — Eversheds Sutherland (US) LLP

(57) ABSTRACT

Forming webs and packages are provided having improved sealability to peelable lidstocks. The thermoformed containers may have a mouth having an opening and a flange disposed about the opening, the flange formed from a forming web and having a thickness greater than about 12 mils and up to about 80 mils. The forming web may have a base layer with a skim coating thereon, a portion of the skim coating being on the flange having a skim coating thickness from about 2 mils to about 8 mils. A peelable lid may include a film with an inner lid sealant layer which is sealed to the portion of the skim coating on the flange, the skim coating and inner lid sealant layer each having a common polyolefin majority component, the common polyolefin component being different than a majority component of the base layer.

20 Claims, 2 Drawing Sheets

Related U.S. Application Data

(60) Provisional application No. 61/974,995, filed on Apr. 3, 2014.

(51) Int. Cl.
*B32B 27/08* (2006.01)
*B32B 27/32* (2006.01)
*B65D 43/02* (2006.01)
*B65D 75/26* (2006.01)

(52) U.S. Cl.
CPC ......... *B65D 43/0202* (2013.01); *B65D 75/26* (2013.01); *B65D 77/2024* (2013.01); *B32B 2255/10* (2013.01); *B32B 2255/26* (2013.01); *B32B 2553/00* (2013.01); *B65D 2543/00314* (2013.01); *B65D 2577/2025* (2013.01)

(58) Field of Classification Search
CPC .. B65D 2543/00314; B65D 2577/2025; B32B 27/32; B32B 27/08; B32B 2553/00; B32B 2255/10; B32B 2255/26
See application file for complete search history.

(56) References Cited

U.S. PATENT DOCUMENTS

| | | | | |
|---|---|---|---|---|
| 4,521,467 A * | 6/1985 | Berger | ................. | B32B 27/08 428/40.6 |
| 4,673,601 A * | 6/1987 | Lamping | ................. | B65D 75/52 220/266 |
| 4,771,935 A | 9/1988 | Hekal | | |
| 4,944,409 A | 7/1990 | Busche et al. | | |
| RE37,171 E * | 5/2001 | Busche | ............. | B65D 77/2044 206/484 |
| 6,302,290 B1 * | 10/2001 | Engelaere | ............... | B29C 65/18 220/359.4 |
| 7,422,782 B2 * | 9/2008 | Haedt | ................. | B32B 7/06 428/213 |
| 7,927,679 B2 * | 4/2011 | Cruz | ................. | B32B 7/10 428/40.1 |
| 8,746,490 B2 * | 6/2014 | Huffer | ................. | B32B 27/32 156/247 |
| 2004/0151932 A1 * | 8/2004 | Galloway | ................. | B32B 7/06 428/515 |
| 2006/0141185 A1 | 6/2006 | Takahashi | | |
| 2007/0131750 A1 | 6/2007 | Drummond et al. | | |
| 2008/0169286 A1 | 7/2008 | McLean et al. | | |
| 2009/0029082 A1 | 1/2009 | Remmele et al. | | |
| 2010/0320206 A1 * | 12/2010 | Caldwell | ............. | B65D 75/563 220/266 |
| 2011/0204054 A1 | 8/2011 | Huffer | | |
| 2012/0305426 A1 | 12/2012 | Valaie | | |
| 2014/0127515 A1 * | 5/2014 | Sakellarides | ........... | B32B 27/08 428/413 |
| 2015/0183564 A1 | 7/2015 | Henderson | | |

FOREIGN PATENT DOCUMENTS

| | | |
|---|---|---|
| CN | 102811924 A | 12/2012 |
| CN | 102985325 A | 3/2013 |
| CN | 203268649 U | 11/2013 |
| DE | 3009007 A1 | 2/1982 |
| EP | 0305976 A2 | 3/1989 |
| JP | 1135070 A | 2/1999 |

OTHER PUBLICATIONS

PCT Written Opinion for PCT/US2015/024028 dated Mar. 9, 2016 (8 pages).

* cited by examiner

THERMOFORMING SHEETS AND THERMOFORMED CONTAINERS PREPARED THEREFROM

CROSS-REFERENCE TO RELATED APPLICATIONS

This application is a continuation of U.S. application Ser. No. 15/301,067, filed Sep. 30, 2016, which is a U.S. national stage application of International Application No. PCT/US2015/024026, filed Apr. 2, 2015, which claims the benefit of U.S. Provisional Application No. 61/974,995, filed Apr. 3, 2014, the disclosures of which are incorporated herein by reference.

BACKGROUND

The present application relates to coextruded sheets adapted for use in form, fill and seal packaging operations and packages manufactured from such sheets.

Form, fill and seal (FFS) packaging is widely used to package a broad variety of products, including disposable medical devices, food stuffs and similar products. In one type of FFS packaging, materials corresponding to a lidstock for packages and a bottom or forming web are supplied in rolls. The forming web material is indexed from the roll into a heating zone where it is heated to forming temperatures. The heated forming web material is then either immediately formed or indexed into a forming station area where multiple box or cup shaped compartments are formed from the forming web using any one of a number of thermoforming techniques (i.e., drape forming, matched mold forming, vacuum forming or pressure bubble-plug assist vacuum forming). Other thermoforming methods are also known.

After forming, the bottom web is typically chilled or cooled and the product to be packaged is inserted into the individual formed compartments. The lidstock material is then applied to the forming web, sealing the compartments. The lidstock material may be sealed to the upper perimeter of the individual compartments using an adhesive and/or by heat sealing. These formed serially connected packages can then be cut from the web and trimmed to the desired final shape. Secondary functions that are selectively integrated into the process (i.e., printing or decorating) either before or after forming, may include embossing, notching, slotting, punching, labeling, counting and stacking.

Although these packages provide numerous advantages, the material incompatibility of the formed bottom web and lidstock can result in delamination, stringing, and/or peeling of the lidstock from the formed bottom web. In addition, many materials used in these packages are only suitable for use in limited applications and cannot withstand the wide range of temperatures, times, and pressures used during many sealing and sterilization processes. Thus, there exists a need for improved sheets useable as lidstock and forming webs in form, fill and seal applications.

SUMMARY

In one aspect, thermoformed containers are provided having a mouth with an opening and a flange disposed about the opening, the flange formed from a forming web and having a thickness greater than about 12 mils and up to about 80 mils. The forming web may have a base layer with a skim coating thereon, a portion of the skim coating being on the flange having a skim coating thickness from about 2 mils to about 8 mils. A peelable lid may include a film with an inner lid sealant layer which is sealed to the portion of the skim coating on the flange, the skim coating and inner lid sealant layer each having a common polyolefin majority component, the common polyolefin component being different than a majority component of the base layer.

In another aspect, a forming web is provided that is adapted to form an easy peelable seal with a lidstock upon heat sealing. The forming web may include a base layer with a thermoplastic polymer and a skim coating thereon, the forming web being configured to form a thermoformed container with a mouth having an opening and including a flange disposed about the opening, the flange formed from the forming web and having a thickness greater than about 12 mils and up to about 80 mils. A portion of the skim coating may be disposed on the flange and have a skim coating thickness from about 2 mils to about 8 mils, the skim coating including a common polyolefin majority component as that of an inner lid sealant layer of the lidstock, the common majority polyolefin component being different than a majority component of the thermoplastic polymer of the base layer.

Additional aspects will be set forth in part in the description which follows, and in part will be obvious from the description, or may be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

DETAILED DESCRIPTION

Figure 1:
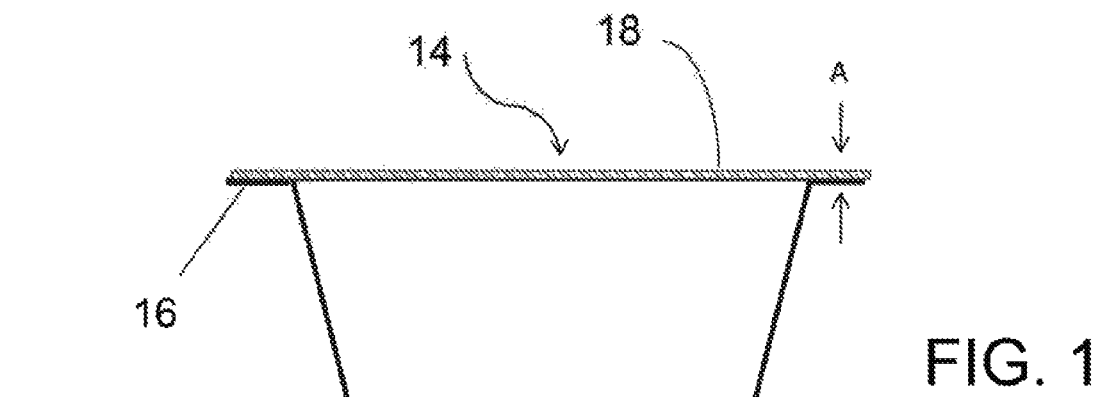
FIG. 1 is a cross-sectional illustration of a thermoformed container and lid according to an embodiment.
Figure 2:
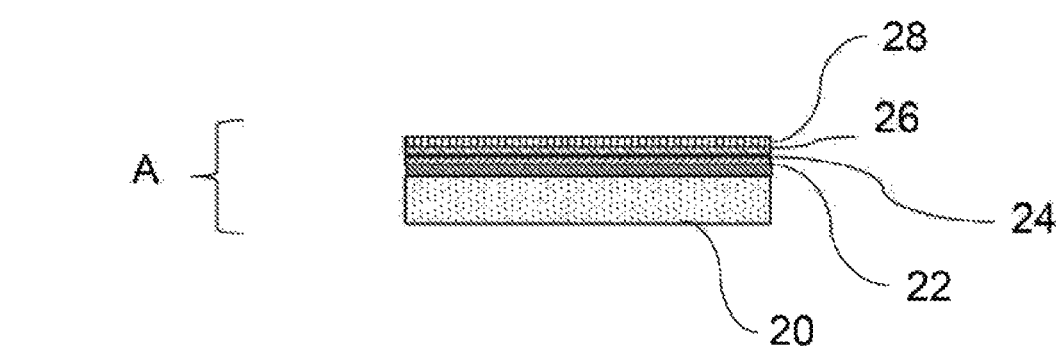
FIG. 2 is an enlarged cross-section of a portion of the thermoformed container and lid illustrated in FIG. 1.

Embodiments of the present description address the above-described needs by providing thermoformed containers having improved compatibility with peelable lidstocks. The improved compatibility results from the sealing of a skim coating of the thermoformed container and an inner sealant layer of the peelable lidstock (i.e., the bottom layer of the peelable lidstock that is contacted with the skim coating of the thermoformed container). The skim coating and inner lid sealant layer each comprise a common polyolefin majority component, thereby eliminating or, at the very least, significantly reducing incompatibility between the base layer of the thermoformed web and the peelable lidstock, particularly when the inner sealant layer of the peelable lidstock has a different majority polymer component than the thermoformed container.

As used herein, "skim coating" and "skim layer" are used interchangeably to refer to a very thin layer disposed on the forming web having a different majority polymer component than the forming web. The skim coating may have a skim coating thickness from about 0.25 to about 25% of the thickness of the forming web. For example, in certain embodiments the skim coating thickness is from about 2 mils to about 8 mils, from about 2 mils to about 6 mils, from about 2 mils to about 4 mils, or from about 2 mils to about 3.5 mils.

The thermoformed containers are formed from a forming web comprising the skim coating disposed on a base layer. The thermoformed container may be a tray or cup in any desired shape formed by thermoforming the forming web. The thermoformed containers generally include a mouth with an opening and flange disposed about the opening to which the peelable lidstock is sealed. The flange generally has a thickness greater than about 12 mils, greater than about 17 mils, or greater than about 20 mils. For example, the flange may have a thickness greater than about 20 mils and up to about 80 mils, from about 25 mils to about 75 mils, from about 30 mils to about 70 mils, from about 30 mils to about 60 mils, from about 30 mils to about 50 mils, or any amount therebetween. A portion of the skim coating on the flange has a skim coating thickness from about 2 mils to about 8 mils, from about 2 mils to about 6 mils, from about 2 mils to about 4 mils, from about 2 mils to about 3.5 mils, from about 2 mils to about 3 mils, or any amount therebetween. Those skilled in the art will appreciate that the forming web prior to thermoforming generally has a thickness greater than that of the thermoformed container (e.g., the forming web will have a thickness from about 5 mils to about 10 mils greater than the flange, from about 7 mils to about 10 mils greater than the flange, and the like). Thus, in certain embodiments the forming web with a thickness greater than about 25 mils is configured to form a thermoformed container with a flange having a thickness greater than about 20 mils. Similarly, a forming web with a thickness from about 30 mils to about 90 mils may be configured to form a thermoformed container with a flange having a thickness from about 20 mils to about 80 mils.

The base layer of the forming web often comprises a material that is different than that of the peelable lidstock and may be a monolayer or multilayer material. For example, in certain embodiments the base layer may comprise polystyrene, polypropylene, polyvinylidene chloride, ethyl vinyl acetate (EVA) copolymer, or combinations thereof. The forming web of the thermoformed container may further comprise one or more intermediate layers disposed between the base layer and the skim coating. A portion of the one or more intermediate layers of the flange may have a thickness from about 2% to about 95% of the thickness of the flange, from about 5% to about 50% of the thickness of the flange, from about 10% to about 40% of the thickness of the flange, from about 10% to about 30% of the thickness of the flange, or from about 10% to about 20% of the thickness of the flange. For example, in embodiments the portion of the one or more intermediate layers of the flange may have a thickness from about 0.5 mils to about 76 mils, from about 5 mils to about 20 mils, from about 5 mils to about 10 mils, or amounts therebetween. In certain embodiments, the intermediate layer comprises a different material than that of the base layer and ties the skim coating to the base layer (i.e., a "tie layer"). In certain embodiments, the tie layer has an affinity to both the base layer and the skim coating so as to tie the base layer to the skim coating and reduce likelihood that the skim coating delaminates from the base layer. Thus, the overall composition of the tie layer may be different from both the composition of the base layer and the composition of the skim coating. For example, the intermediate layer may comprise a polyethylene (LDPE, LLDPE, and the like). In addition or in the alternative, the intermediate layer may function to reduce the seal initiation temperature and/or provide an improved moisture barrier.

In instances where a high barrier thermoformed container is desired, the base layer and/or one or more intermediate layers of the forming web may include a barrier layer to extend the shelf life of the products to be packaged in the thermoformed container. For example, barrier layers may be used where products to be packaged are sensitive to certain gases, or loss of volatiles, flavors, or aromas. Materials suitable for use as barrier materials are known in the art, including ethylene vinyl alcohol, nylon, polyvinylidene chloride, liquid crystalline polymer, or any combination thereof. The barrier layers also may include barrier enhancing additives, such as nano-additives or oxygen scavengers.

The skim coating of the forming web generally comprises a material that is easy to melt, has good flow properties, and is readily compatible with the inner lid sealant layer of the peelable lidstock. In certain embodiments, the skim coating and the inner lid sealant layer each comprise sealant compositions having a common polyolefin majority component, the common polyolefin majority component being different than a majority component of the base layer. As used herein, a "majority component" is the component that is present in the greatest quantity. In exemplary embodiments, the common polyolefin majority component of the sealant compositions of the skim coating and inner lid sealant layer comprises from about 40% to about 100% by weight. For example, the common polyolefin majority component may comprise a polyethylene or blend of two or more polyethylenes (i.e., a high density polyethylene (HDPE) and low density polyethylene (LDPE)), the total amount of the common polyolefin majority component comprising the blend of two or more polyethylenes may be up to about 80% to about 100% by weight of the sealant compositions. In an embodiment, the HDPE and LDPE are present in a ratio from 80:20 to 20:80, 60:40 to about 40:60, or ratios therebetween. For example, the HDPE may be present in an amount from about 40% to about 60% weight of the sealant compositions and the LDPE may be present in an amount from about 20% to about 40% by weight of the sealant compositions.

The composition of the sealant compositions may further comprise one or more additives, such as a peelability additive capable of improving peelability of the lid, and may be either immiscible or partially miscible in the main resin matrix. Non-limiting examples of additives that may be used in the sealant compositions of the skim coating and inner lid sealant layer include inorganic additives such as talc, calcium carbonate, fibers, clay or nano-alternatives thereof, and organic additives such as polybutadiene, polystyrene, and polyesters. The one or more additives may be present in the compositions of the sealant compositions in amounts from about 0.01% to about 50% by weight, with the total amount of the one or more additives comprising up to about 50% by weight of the compositions. In certain embodiments, the sealant compositions of the skim coating and inner lid sealant layer may further comprise at least one peelability additive in an amount from about 0.1% to about 45% by weight of the sealant compositions. For example, the sealant compositions may comprise at least one inorganic additive in an amount from about 1% to about 20% by weight of the sealant compositions and at least one organic peelability additive in an amount from about 5% to about 45% by weight of the sealant compositions. In another embodiment, the sealant compositions may comprise at least one inorganic additive in an amount from about 1% to about 10% by weight of the sealant compositions and at least one organic peelability additive in an amount from about 10% to about 20% by weight of the sealant compositions.

The forming web may be prepared using appropriate methods known to those skilled in the art. For example, the forming web may be extruded or laminated using methods such as multimanifold die coextrusion, feedblock technology, extrusion coating, and thermal lamination. Methods for making thermoformed containers also are known in the art, and may include (i) providing the forming web; (ii) heating the forming web; (iii) drawing the heated forming web into a mold to shape the material. The processes of making the forming web and thermoformed containers may be performed in series (i.e., in-line thermoforming) or independently (i.e., off-line thermoforming). For example, in certain embodiments in which the base layer comprises polystyrene, the forming web may be rolled and stored for later processing of the forming web into the thermoformed container. In other embodiments in which the base layer comprises a polypropylene, the thermoforming of the forming web may be performed in-line to produce the desired thermoformed container shape.

Advantageously, embodiments of the present application permit sealing of the lids to the thermoformed container at lower temperatures and pressures and shorter dwell times; however, those of ordinary skill in the art will appreciate that the particular properties used for sealing the lids to the thermoformed containers will vary depending on the products being packaged and equipment being used. For example, the lids may be sealed to the thermoformed containers at temperatures from about 175° C. to about 235° C., pressures from about 20 psi to about 110 psi, and over a dwell time from about 0.3 seconds to about 4 seconds.

An exemplary embodiment of a package 10 is illustrated in FIG. 1. The package 10 includes a cup-shaped thermoformed container 12 with a mouth 14 having an opening and a flange 16 disposed about the opening. A peelable lidstock 18 is sealed to the flange 16 of the thermoformed container. The thermoformed container 12 is formed from a forming web including a base layer 20, an intermediate "tie" layer 22, and a skim coating 24. The peelable lidstock includes one or more layers of flexible film 28 (i.e., polyolefins, metallized polyolefins, papers, foils, and the like) with an inner lid sealant layer 26 sealed to the skim coating 24 of the flange.

The packages of the present application advantageously provide an easy peel lid/thermoformed container system that is optimized to seal at low temperature over a wide range of temperatures and pressures. Such systems provide numerous advantages for food or medical packaging applications, including a wide range of sealing temperature; short sealing time; an easy-to-peel lid; a thermoformed container/lid system with high burst strength; suitable for high-temperature and moisture processes, such as steam sterilization; and/or presents a clean appearance when peeled, with minimal or no obvious stringing, fuzziness, tearing, or delamination. Such systems also may provide further advantages for medical applications, including being suitable for use in multiple sterilization methods (e.g., ETO, vapor hydrogen peroxide sterilization, and radiation sterilization). Additionally, when breathable material, such as a spunbonded nonwoven polyolefin web is used for the peelable lid (e.g., Tyvek®), there may be a reduced potential for a breach of the microbial barrier, and increased breathability of the uncoated lid than the conventional coated lids that have been used.

Embodiments of the present description are further illustrated by the following examples, which are not to be construed in any way as imparting limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims. Unless otherwise specified, quantities referred to by percentages (%) are by weight (wt %).

EXAMPLES

Easy peel lidding/cup systems were produced for testing using various formulations of lidstock and sheets for thermoforming the cups. Three lidstock films were produced from multilayer films, each having the structure:

oriented polyethyelene terephthalate (OPET)
white polyethylene (PE)
white acrylic acid copolymer (EAA)
Foil
Sealant Three different sealants were prepared from blends of ethylene acrylic acid copolymers (EAA), high density polyethylene (HDPE), low density polyethylene (LDPE), polybutylene (PB), and talc, as follows:

|  | Sealant 96<br>8# EAA-8# | Sealant 97<br>#5 EAA-5# | Sealant 98<br>8# EAA-8# |
|---|---|---|---|
| HDPE | 49 | 49 | 51 |
| LDPE | 29 | 29 | 29 |
| PB | 16 | 16 | 10 |
| Talc | 6 | 6 | 10 |

Four different polystyrene cups were prepared from a polystyrene film coextruded with LDPE and either no skim layer (control) or a 2 mil skim layer using the sealant compositions summarized in the table below.

| Cup 01 | Cup 42 | Cup 43 | Cup 50 |
|---|---|---|---|
| PS | PS | PS | PS |
| 7 mil LDPE | 9 mil LDPE | 7 mil LDPE | 7 mil LDPE |
| 2 mil Skim Layer | — | 2 mil Skim Layer | 2 mil Skim Layer |
| (Sealant 96/97/98) |  | (LLDPE) | (ULDPE) |

Figure 3:
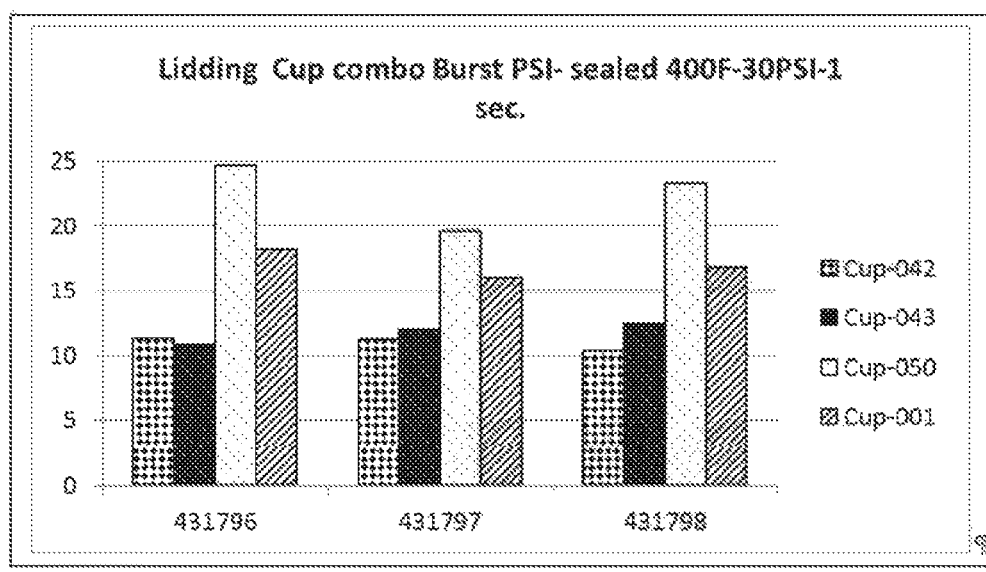
FIG. 3 is a graph comparing the burst pressure of thermoformed containers prepared in the Examples.

The lids were sealed to the cup at temperatures of 350, 375, or 400° F.; pressures of 20 or 30 psi; and a dwell time of 0.5 or 1.0 seconds. The burst pressures were measured for each container, and exemplary data of the thermoformed containers sealed at 400° F., 30 psi, and 1.0 second are illustrated in FIG. 3.

The cups produced using the skim layers had a high burst pressure and sealed at a lower temperature than cups without the skim layer. In addition, the cups with the skim layers had a very low stringing tendency and were not prone to delamination, properties consistent with the desired easy peel functionality.

While the invention has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereof.

We claim:
1. A package comprising:
   a thermoformed container formed from a forming web comprising a base layer with a skim coating thereon, wherein the thermoformed container comprises a mouth having an opening and including a flange disposed about the opening, the flange formed from the forming web, wherein a portion of the skim coating is on the flange; and
   a peelable lid comprising a film with an inner lid sealant layer sealed to the portion of the skim coating on the flange;
   wherein the skim coating and inner lid sealant layer have a polyolefin majority component in common, the polyolefin majority component being different than a majority component of the base layer,
   wherein the peelable lid, when peeled, is separated from the thermoformed container without delamination, and
   wherein the skim coating comprises:
      at least one polyethylene in an amount from about 35 percent to about 80 percent by weight of the skim coating;
      at least one inorganic additive in an amount from about 1 percent to about 20 percent by weight of the skim coating, wherein the at least one inorganic additive is selected from the group consisting of talc, calcium carbonate, fibers, clays, and combinations thereof; and
      at least one peelability additive in an amount from about 5 percent to about 45 percent by weight of the skim coating, wherein the at least one peelability additive is selected from the group consisting of polybutylene, polystyrene, polyesters, and combinations thereof.

2. The package of claim 1, wherein the flange has a thickness greater than about 12 mils and up to about 80 mils.

3. The package of claim 1, wherein the skim coating has a thickness of from about 2 mils to about 8 mils.

4. The package of claim 1, wherein the forming web further comprises an intermediate layer disposed between the base layer and the skim coating, a portion of the intermediate layer of the flange having a thickness comprising from about 5 percent to about 50 percent of the thickness of the flange.

5. The package of claim 4, wherein the intermediate layer comprises a different material than that of the base layer and ties the skim layer to the base layer.

6. The package of claim 4, wherein the intermediate layer comprises a polyethylene and the base layer is selected from the group consisting of a polypropylene, polystyrene, polyvinylidene chloride, ethyl vinyl acetate (EVA) copolymer, and combinations thereof.

7. The package of claim 1, wherein the skim coating and inner lid sealant layer each comprise:
   at least one polyethylene in an amount from about 35 percent to about 80 percent by weight;
   at least one inorganic additive in an amount from about 1 percent to about 10 percent by weight, wherein the at least one inorganic additive is selected from the group consisting of talc, calcium carbonate, fibers, clays, and combinations thereof; and
   at least one peelability additive in an amount from about 10 percent to about 20 percent by weight, wherein the at least one peelability additive is selected from the group consisting of polybutylene, polystyrene, polyesters, and combinations thereof.

8. The package of claim 1, wherein the inner lid sealant layer is sealed to the entire portion of the skim coating on the flange.

9. A package comprising:
   a thermoformed container formed from a forming web comprising a base layer with a skim coating thereon, wherein the thermoformed container comprises a mouth having an opening and including a flange disposed about the opening, the flange formed from the forming web, wherein a portion of the skim coating is on the flange; and
   a peelable lid comprising a film with an inner lid sealant layer sealed to the portion of the skim coating on the flange;
   wherein the skim coating and inner lid sealant layer have a polyolefin majority component in common, the polyolefin majority component being different than a majority component of the base layer,
   wherein the inner lid sealant layer is sealed to the entire portion of the skim coating on the flange, and
   wherein the skim coating comprises:
      at least one polyethylene in an amount from about 35 percent to about 80 percent by weight of the skim coating;
      at least one inorganic additive in an amount from about 1 percent to about 20 percent by weight of the skim coating, wherein the at least one inorganic additive is selected from the group consisting of talc, calcium carbonate, fibers, clays, and combinations thereof; and
      at least one peelability additive in an amount from about 5 percent to about 45 percent by weight of the skim coating, wherein the at least one peelability additive is selected from the group consisting of polybutylene, polystyrene, polyesters, and combinations thereof.

10. The package of claim 9, wherein the flange has a thickness greater than about 12 mils and up to about 80 mils.

11. The package of claim 9, wherein the skim coating has a thickness from about 2 mils to about 8 mils.

12. The package of claim 9, wherein the forming web further comprises an intermediate layer disposed between the base layer and the skim coating, a portion of the intermediate layer of the flange having a thickness comprising from about 5 percent to about 50 percent of the thickness of the flange.

13. The package of claim 12, wherein the intermediate layer comprises a different material than that of the base layer and ties the skim layer to the base layer.

14. The package of claim 13, wherein the intermediate layer comprises a polyethylene and the base layer is selected from the group consisting of a polypropylene, polystyrene, polyvinylidene chloride, ethyl vinyl acetate (EVA) copolymer, and combinations thereof.

15. The package of claim 9, wherein the skim coating and inner lid sealant layer each comprise:
   at least one polyethylene in an amount from about 35 percent to about 80 percent by weight;
   at least one inorganic additive in an amount from about 1 percent to about 10 percent by weight, wherein the at least one inorganic additive is selected from the group consisting of talc, calcium carbonate, fibers, clays, and combinations thereof; and
   at least one peelability additive in an amount from about 10 percent to about 20 percent by weight, wherein the at least one peelability additive is selected from the group consisting of polybutylene, polystyrene, polyesters, and combinations thereof.

16. The package of claim 9, wherein the peelable lid, when peeled, is separated from the thermoformed container without delamination.

17. A forming web adapted to form an easy peelable seal with a lidstock upon heat sealing, wherein the lidstock comprises an inner lid sealant layer, the forming web comprising:
a base layer comprising a thermoplastic polymer; and
a skim coating thereon, wherein the skim coating and the inner lid sealant layer have a polyolefin majority component in common, the polyolefin majority component being different than a majority component of the thermoplastic polymer of the base layer,
wherein the forming web has a thickness from about 17 mils to about 90 mils and configured to form a thermoformed container comprising a mouth having an opening and including a flange disposed about the opening, the flange formed from the forming web and having a thickness greater than about 12 mils and up to about 80 mils, a portion of the skim coating being on the flange and having a skim coating thickness from about 2 mils to about 8 mils.

18. The forming web of claim 17, wherein the skim coating comprises at least one polyethylene in an amount from about 35% to about 80% by weight of the skim coating, at least one inorganic additive in an amount from about 1% to about 20% by weight of the skim coating, in which the at least one inorganic additive is selected from the group consisting of talc, calcium carbonate, fibers, clays, and combinations thereof, and at least one peelability additive in an amount from about 5% to about 45% by weight of the skim coating, in which the at least one peelability additive is selected from the group consisting of polybutylene, polystyrene, polyesters, and combinations thereof.

19. A package comprising:
a thermoformed container formed from a forming web comprising a base layer with a skim coating thereon, wherein the thermoformed container comprises a mouth having an opening and including a flange disposed about the opening, the flange formed from the forming web, wherein a portion of the skim coating is on the flange; and
a peelable lid comprising a film with an inner lid sealant layer sealed to the portion of the skim coating on the flange;
wherein the skim coating and inner lid sealant layer have a polyolefin majority component in common, the polyolefin majority component being different than a majority component of the base layer,
wherein the inner lid sealant layer is sealed to the entire portion of the skim coating on the flange, and
wherein the peelable lid, when peeled, is separated from the thermoformed container without delamination.

20. The package of claim 19, wherein the skim coating and inner lid sealant layer each comprise:
at least one polyethylene in an amount from about 35 percent to about 80 percent by weight;
at least one inorganic additive in an amount from about 1 percent to about 10 percent by weight, wherein the at least one inorganic additive is selected from the group consisting of talc, calcium carbonate, fibers, clays, and combinations thereof; and
at least one peelability additive in an amount from about 10 percent to about 20 percent by weight, wherein the at least one peelability additive is selected from the group consisting of polybutylene, polystyrene, polyesters, and combinations thereof.

\* \* \* \* \*